UNITED STATES PATENT OFFICE.

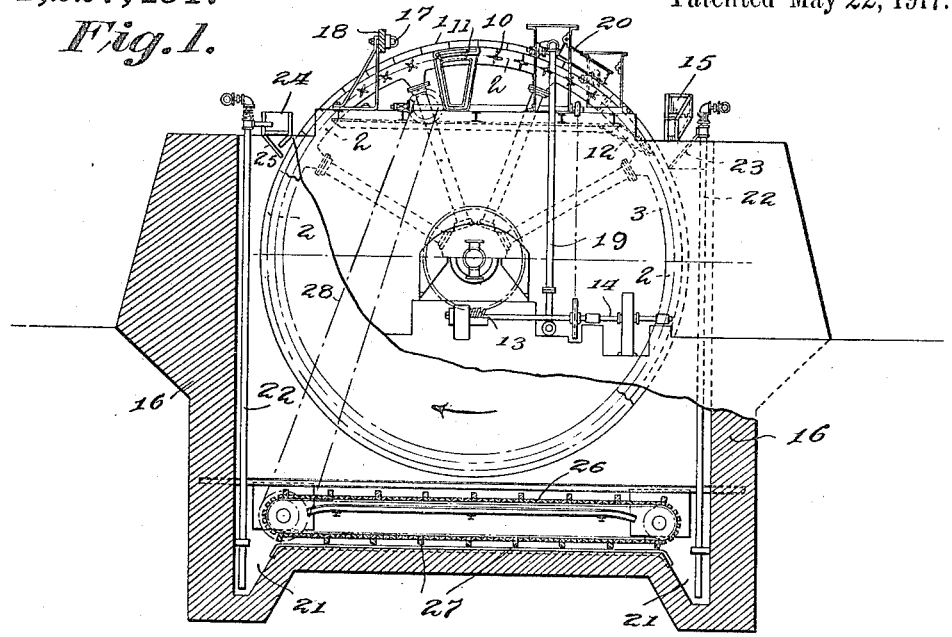

CYRUS ROBINSON, OF MOUNT VERNON, NEW YORK, ASSIGNOR TO METALLURGICAL ENGINEERING & PROCESS CORPORATION, A CORPORATION OF NEW YORK.

DEHYDRATOR.

1,227,491.  Specification of Letters Patent.  Patented May 22, 1917.

Application filed July 21, 1913, Serial No. 780,347. Renewed October 10, 1916. Serial No. 124,901.

*To all whom it may concern:*

Be it known that I, CYRUS ROBINSON, a subject of the King of Great Britain, residing at Mount Vernon, in the county of Westchester and State of New York, have invented certain new and useful Improvements in Dehydrators, of which the following is a specification, reference being had therein to the accompanying drawing.

This invention relates to improvements in dehydrating devices of the type shown in my co-pending application, Serial No. 594,704, filed November 29, 1910.

In the treatment of ores by the cyanid or other similar processes, the ores are crushed and then subjected to the dissolving action of the cyanid or other solution. After the dissolving of the values has been completed it is necessary to separate the undissolved solid matter from the solution containing the dissolved values. It is for effecting this work of separation that a machine embodying my invention is intended. The machine is of the drum type and, stated briefly, the principal object of my present improvement is to provide means whereby a machine of this type can be used not only for the separation of the liquid from the solid matter of "slimes" but also for the separation of liquids from the solid matter of coarser material containing "sands." Another object is to provide improved means for washing the material on the filtering surface. Other objects will be apparent from the following specification and claims.

In the accompanying drawings I have shown one embodiment of my invention, some of the parts being indicated more or less diagrammatically for the reason that they are shown in my earlier application, above referred to, to which reference can be made for an understanding of the details.

Of the drawings—

Figure 1 is an end elevation partly in section;

Fig. 2 is a longitudinal sectional view.

Referring to the drawings 1 represents as a whole a drum which is made up of a plurality of sections 2 each of which has a canvas or other filtering medium on its exterior and is provided beneath the canvas with grooves or apertures. These grooves or apertures are connected with the hollow rings 3, 3 which, in turn, are connected by means of the hollow spokes 4, 4 with the hollow shaft 5. This shaft is provided at its ends with conduit sections 6 and 7 which are separated from each other and which are respectively connected at their outer ends to vacuum and pressure pumps. Suitable bearings 8, 8 are provided for the shaft.

For connecting the several filter sections with the hollow rings, I provide for each section 2 valves 9, 9 which are controlled by star wheels 10, 10. At 11 and 12 I provide pins at the vacuum end, as shown in Fig. 1, for engaging the star wheels to turn them through quarter revolutions. It will be understood that similar pins are provided at the opposite pressure end. The drum is rotated by means of suitable gearing such as the worm and worm wheel at 13 and the shaft 14. As the drum is turned, the pin 12 at the vacuum end turns each valve 10 to connect the corresponding filter section with the vacuum device and the pin 11 serves to turn each valve to close it and disconnect the corresponding filter section from the vacuum device. Simultaneously a pin at the other end opposite to 12 closes the valve 10 at that end and disconnects the corresponding filter sections from the pressure device, and a pin opposite to the pin 11 serves to turn the valves to connect the filter sections with the pressure device. The result is that all of the sections from 11 around to 12 are connected with the pressure device and disconnected from the vacuum device, while those from 12 around to 11 are connected with the vacuum device and disconnected from the pressure device.

15 is a trough mounted at the top of the receptacle 16 in which the drum is partly inclosed. The material to be treated is fed to this trough in any desired way and passes out through the apertured bottom thereof onto the descending side of the drum. The suction on the filter sections causes a large part of the solid matter of this material or pulp to become attached to the filter medium in the form of a thin layer or cake. It will be understood that the receptacle 16 is filled with pulp and that the solid matter continues to be attached as the drum rotates.

At 17 I provide a wash pipe which extends longitudinally of the drum throughout its entire length. This type is provided with apertures adapted to deliver jets of water against baffle-board 18 from which it falls onto the filtering medium. This wash water is immediately sucked through the cake which has accumulated and serves to wash it and remove from it the residue of solvent containing values. As each filter section passes the pin 11 the suction is cut off and pressure supplied, and this pressure serves to loosen the cake and adapt it for easy removal. At 19 there is a spray pipe which is perforated to direct powerful jets of wash water against the cake to loosen and remove it. The loosening and removal of the cake is completed by means of the scraper 20. The spray pipe and scraper are inclined so that the tendency is for the material to be worked off from one end of the drum into a suitable trough or receptacle.

When coarse materials are fed to the machine there is a marked tendency for the larger and heavier particles to resist the suction action of the filter sections and to settle downward by gravity to the bottom of the tank. Because of this tendency it has been heretofore accepted that filtering devices of this drum type are not adapted for the handling of coarse materials. In order to adapt the machine for handling relatively coarse materials I provide at opposite sides of the bottom of the receptacle 16 a series of wells 21, 21, and with these wells I provide air lifts 22, 22, which can be of any usual or preferred construction. The air lifts at the initial side of the machine discharge onto a feed board 23 which carries material downward to points adjacent the surface of the drum. The air lifts at the other side of the machine terminate in a trough 24 which discharges onto an inclined board 25, this serving to guide the materials to the surface of the drum. In order to insure the entry into the wells of all of the materials which settle, I provide a combined agitating and conveying device 26. This is simply an endless belt conveyer having transverse bars 27, 27. It is driven by means of a chain 28 which receives its power through suitable connections from the main drive shaft 14. This conveyer or agitator 26 serves to keep the liquid in the bottom of the receptacle stirred and to prevent free settling of the material. However, any sands which do settle onto the upper strand of the conveyer are carried backward and discharged into the rear series of wells 21. Any material which finds its way underneath the conveyer to the floor of the receptacle is scraped by the bars 27, 27, into the front series of wells 21. All of the material which reaches the wells is caught by the air lifts 22, 22, and if lifted upward and discharged onto the boards 23 and 25, which guide it onto the filtering medium of the drum.

By means of these air lifts 22, 22, and the conveyer for delivering material to them, the final settling of material to the bottom of the receptacle to accumulate there is prevented and there is an assurance that all of the material will be finally deposited upon the drum and at last carried off with the wash water at the end of the scraper.

It will be understood that the liquid in the receptacle 16 can be permitted to rise to any desired level. This level will depend upon various conditions, such as the character of the ore being treated, the percentage of sands, the atmospheric pressure, etc. In many cases, especially at high altitudes, I prefer to permit the liquid to rise to a level near the top of the receptacle and considerably above the axis of the drum. At high altitudes the vacuum pressure is low, and it is desirable to increase this by means of the liquid column in the receptacle. When the receptacle is filled to a level near the top, a strong inward pressure is exerted on the drum, and this pressure acts with the vacuum to force the liquid inward.

It will be observed that the points of feeding of the pulp to the drum are between the vertical bounding planes of the drum. Referring, for instance, to the feed board 23, it will be seen that the lower inner edge of this is above the outer side of the drum so that no material discharge from the board can reach the bottom of the receptacle without being deflected by, and passing along, the surface of the drum. In this way a very large percentage of the solid matter is caught and attached to the drum surface.

What I claim is:—

1. In a dehydrating machine, the combination of a rotating filtering drum, a receptacle partly inclosing the drum, means for feeding to the receptacle ore pulp to be treated, means near the top of the drum for removing material from the surface thereof, and means for raising material from the bottom of the receptacle and feeding it directly onto the drum.

2. In a dehydrating machine, the combination of a rotating filtering drum, a receptacle partly inclosing the drum, means for feeding to the receptacle ore pulp to be treated, means near the top of the drum for removing material from the surface thereof, and an air lift for raising material from the bottom of the receptacle and feeding it directly onto the drum.

3. In a dehydrating machine, the combination of a rotating filtering drum, a receptacle partly inclosing the drum, means for feeding to the receptacle ore pulp to be treated, means near the top of the drum for removing material from the surface thereof, and means for raising material from the bottom of the receptacle at the descending side of the drum and feeding it directly onto the drum.

4. In a dehydrating machine, the combination of a rotating filtering drum, a receptacle partly inclosing the drum, means for feeding to the receptacle ore pulp to be treated, means near the top of the drum for removing material from the surface thereof, and means for raising material from the bottom of the receptacle at the ascending side of the drum and feeding it directly onto the drum.

5. In a dehydrating machine, the combination of a rotating filtering drum, a receptacle partly inclosing the drum, means for feeding to the receptacle ore pulp to be treated, means near the top of the drum for removing material from the surface thereof, means for raising material from the bottom of the receptacle at the descending side of the drum and feeding it directly onto the drum, and means for raising material from the bottom of the receptacle at the ascending side of the drum and feeding it directly onto the drum.

6. In a dehydrating machine, the combination of a rotating filtering drum, a receptacle partly inclosing the drum, means for feeding to the receptacle ore pulp to be treated, means near the top of the drum for removing material from the surface thereof, means for raising material from the bottom of the receptacle and feeding it onto the drum, and a conveyer in the bottom of the receptacle for moving material horizontally into the range of action of the lifting means.

7. In a dehydrating machine, the combination of a rotating filtering drum, a receptacle partly inclosing the drum, means for feeding to the receptacle ore pulp to be treated, means near the top of the drum for removing material from the surface thereof, a spray pipe for the wash water arranged transversely of the drum near the top behind the said means for removing material, and a baffle board positioned to intercept the spray from the said pipe and deflect it onto the drum.

8. In a dehydrating machine, the combination of a rotating, filtering drum, a receptacle partly inclosing the drum, means for feeding ore pulp to the receptacle at points between the vertical bounding planes of the drum but remote from the center thereof, means near the top of the drum for removing material from the surface thereof, and means for raising material from the bottom of the receptacle and feeding it directly onto the drum.

In testimony whereof I affix my signature in presence of two witnesses.

CYRUS ROBINSON.

Witnesses:
RAYMOND ROGERS,
W. F. GILLESBY.

Copies of this patent may be obtained for five cents each, by addressing the "Commissioner of Patents, Washington, D. C."